United States Patent [19]

Trautwein

[11] Patent Number: 4,723,580
[45] Date of Patent: Feb. 9, 1988

[54] CABLE SHEATH ASSEMBLY

[76] Inventor: Jerry B. Trautwein, 395 Cottonwood Ct., Broomfield, Colo. 80020

[21] Appl. No.: 922,944

[22] Filed: Oct. 24, 1986

[51] Int. Cl.$^4$ .............................................. F16L 07/00
[52] U.S. Cl. ..................................... 138/163; 138/92; 174/68 C; 174/101
[58] Field of Search ................. 138/92, 156, 157, 168, 138/163; 174/48, 68 C, 70 C, 72 C, 101

[56] References Cited

U.S. PATENT DOCUMENTS

| 1,066,945 | 7/1913 | Probert | 138/163 |
| 1,255,841 | 2/1918 | Adams | 138/157 X |
| 2,451,004 | 10/1948 | Van Antweep | 174/101 X |
| 3,321,571 | 5/1967 | Lynch | 174/101 |

FOREIGN PATENT DOCUMENTS 1017821 1/1966 United Kingdom ................ 174/101

Primary Examiner—James E. Bryant, III
Attorney, Agent, or Firm—Edwin L. Spangler, Jr.

[57] ABSTRACT

A wall-mounted cable sheath asembly defining a raceway for housing and protecting insulated electric cables and the like is disclosed, one part of which comprises a springable channel-shaped housing having an open base produced by a pair of opposed inturned essentially coplanar flanges depending from its divergent sides, the other part comprises a clip for fastening the housing to a supporting surface that has a centrally-located more or less planar web which carries along its top and bottom edges a pair of parallel generally V-shaped flanges, each such flange having divergent outboard wings spaced apart and inclined to form abutments for the sides of the housing when sprung outward and released to spring into place thereagainst, and the free edges of the wings of each such V-shaped flange terminating short of the plane of its own web a distance selected to accept the inturned flanges of the housing that spring into place therebeneath along with the hooked end of the installation tool.

4 Claims, 4 Drawing Figures

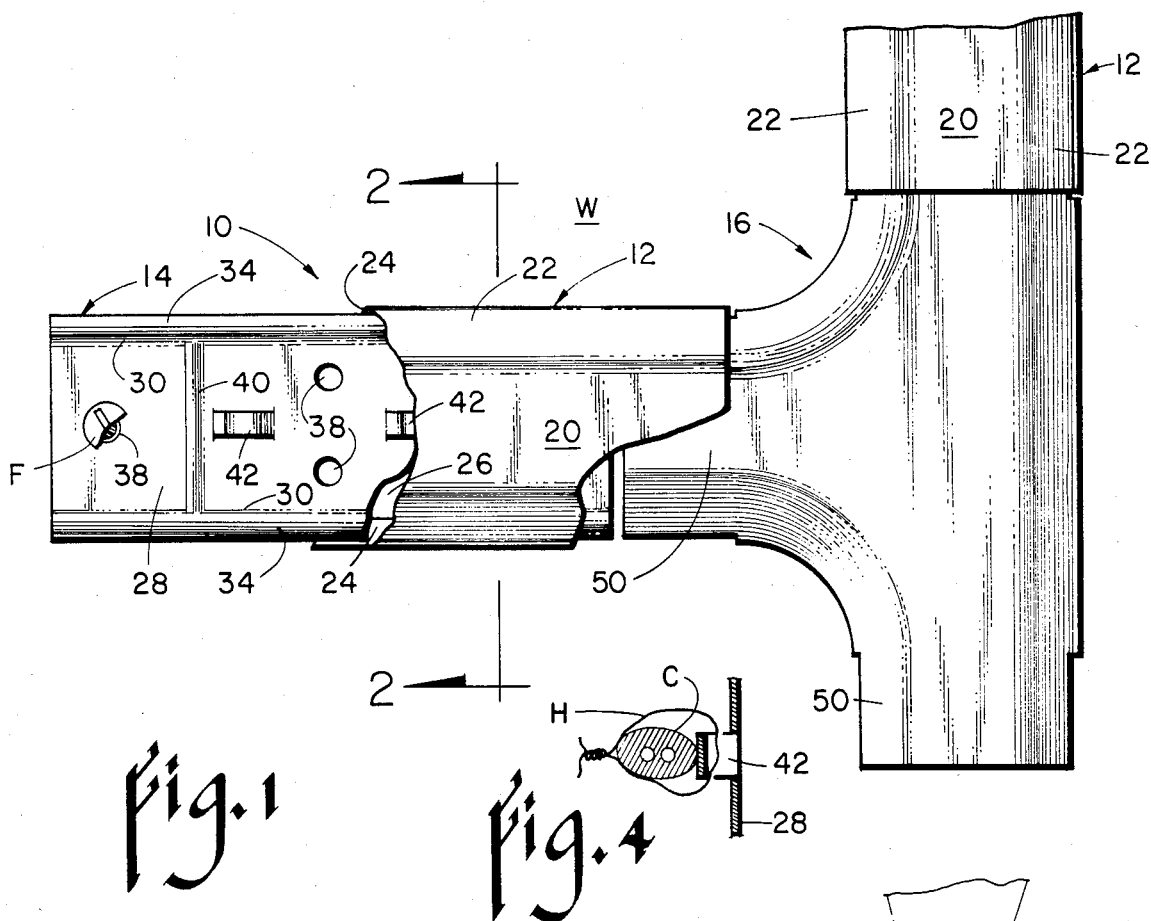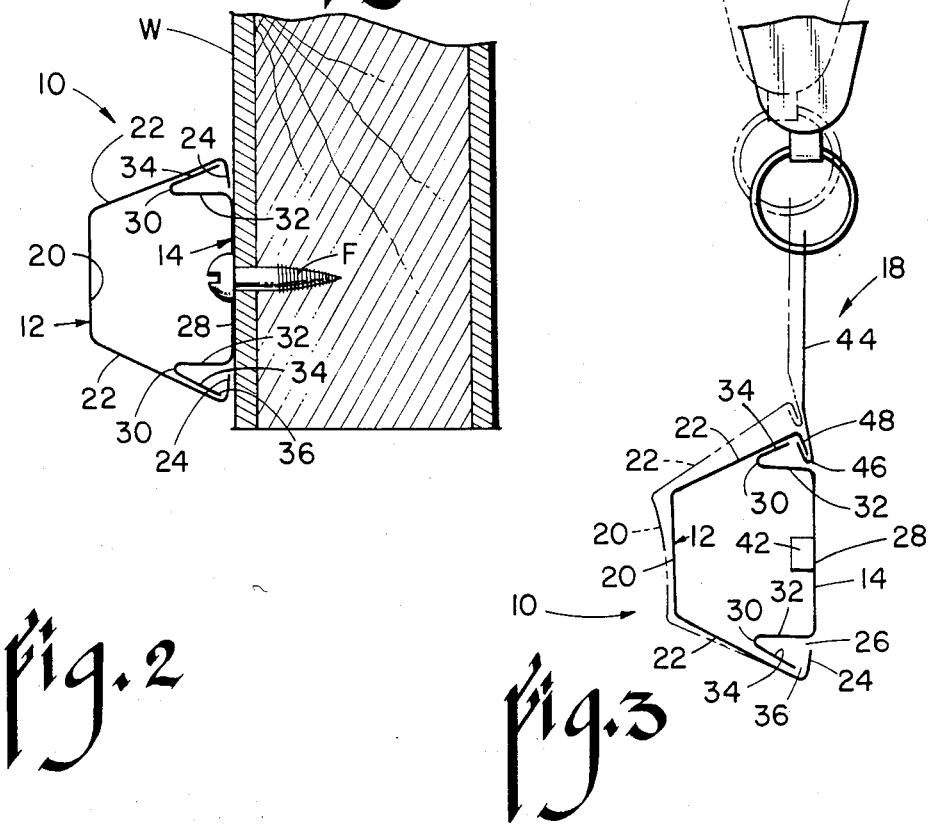

CABLE SHEATH ASSEMBLY

BACKGROUND OF THE INVENTION

Modern living requires a great number of electrical appliances, television sets and other components which are connected in some fashion to a power cord, a cable or some such conduit. Ordinarily, these items are strung inside walls and made available through so-called "convenience outlets". In older structures especially, the available power may be insufficient to handle the loads. In others, stringing cable, antenna wires and electric power conduit inside existing walls can become difficult and quite expensive. Accordingly, a need exists for an easily accessed external raceway to safely house such cords and the like without having to bury them in a wall.

FIELD OF THE INVENTION

This invention relates to an improved wall-mounted cable sheath assembly for housing and protecting insulated electrical cables and the like.

DESCRIPTION OF THE RELATED ART

Wall-mounted cable sheaths of one type or another defining raceways for electrical wiring and other purposes are old and well known in the art. Characteristic of such devices are those channel-shaped ones, the flanges of which detachably receive some sort of coverplate. The Myers U.S. Pat. No. 4,092,486; Australian Patent No. 257319; French Patent Nos. 45,111, 1,305,181, 1,470,097, 1,552,492, 1,537,958, and 2,383,539; German Patent No. 54.729; British Patent No. 827,156; Finnish Patent No. 41302; and Austrian Patent No. 228299 all exemplify much this same general construction. In some, the channel member is attached to the supporting surface, whereas, in others the channel defines the coverplate and a mounting bracket of sorts is attached to the wall. The Brenneman U.S. Pat. No. 3,325,585 is directed to a toothed fastener which also functions as the cable sheath while Shira's U.S. Pat. No. 3,786,171 shows a hinged coverplate. Shira's coverplate flexes to permit its downturned flange to snap in behind the mounting bracket and, as such, this patent together with Australian Patent No. 403,342 and British Patent No. 1,246,665 comprise the closest prior art known to applicant. In both the British and Australian assemblies, it is virtually impossible to remove the coverplates once they are attached, at least without ruining the coverplate, the channel, or both, since there is no exposed edge free for receiving a disaasembling tool. In the Shira assembly, even though wall-engaging flange 22 is formed of a flexible material like hinge 14, it is designed to fit snugly against wall 4 and it would be a practical impossibility to reopen the hinged coverplate by getting a tool behind this flange and grasping it to flex member 18 to the degree necessary to free lip 21 from behind offset 34 without damaging one or more of these parts to an extent where they could not be reused, to say nothing of what might happen to the wall surface behind them. Once again, the free edge of lip 21 essentially rests atop the shoulder formed between offset portion 34 and the main wall-engaging surface of the mounting plate such that a tool could not be inserted to engage and lift the aforementioned lip. It is also worthy of note in the Shira unit that since the hinged coverplate and backing plate mounted on the wall are of an integrally-formed unitary construction, both must go the full length of each run, all of which greatly increases the expense of the installation.

SUMMARY OF THE INVENTION

Applicant has developed a design for a cable raceway that is far simpler and easier to use than any of the previously-mentioned prior art assemblies in that it consists of an easily fabricated sheet metal channel and a stamped bracket or hanger for mounting the latter which need be installed only at spaced intervals of several feet. These elements together with a blade-like tool having a closely-spaced U-shaped hook on the end, a hammer, and fasteners suitable for attaching the brackets to the wall, are all that are needed to complete an installation. After hooking the lowermost upturned flange of the channel underneath and behind the downwardly-sloping wing of the V-shaped flange running along the bottom of the mounting bracket, the hook on the end of the tool can be hooked underneath the downturned flange running along the top edge of the channel and lifted to spread the divergent sidewalls apart far enough for the free edge of the downturned flange running along the upper sidewall to rest atop the upwardly-sloping wing of the upper V-shaped flange of the bracket where it can be pushed rearwardly into place against the wall at which point it springs down into place behind the aforementioned wing, the free edge of which lies spaced away from the wall. Moreover, to remove the channel and gain access to the cables inside thereof, it is only necessary to reverse the assembly process, all without damage to either the parts of the cable sheath or the surface it is mounted upon. The wings of the V-shaped flanges on the bracket define stops which hold and maintain the divergent sidewalls of the channel in fixed spaced relation to one another while, at the same time, at least the upper one produces a cam surface up which the free edge of the downturned flange of the channel rides before springing into place behind the latter.

It is, therefore, the principal object of the present invention to provide a novel and improved cable sheath assembly for housing and protecting insulated electric wires and the like.

A second objective of the invention is to provide a device of the type aforementioned which can be opened up and reused without damage to either it or the surface upon which it is mounted.

Another object of the invention herein disclosed and claimed is to provide a raceway for insulated cables along with a tool for installing same that makes installation simple and quick for even unskilled persons.

Still another objective of the invention forming the subject matter hereof is that of providing an assembly of parts including the installation tool that combine to produce a cable raceway, all of which are simple fabrications formed by stamping, rolling or otherwise shaping ordinary sheet metal stock.

An additional object is that of providing a novel method for installing the sheath assembly.

Further objects are to provide a cable raceway assembly which is rugged, compact, safe, versatile and even decorative.

Other objects will be in part apparent and in part pointed out specifically hereinafter in connection with the description of the drawings which follows, and in which:

BRIEF DESCRIPTION OF THE DRAWINGS

FIG. 1 is a front elevational view showing the cable sheath assembly including the channel, mounting bracket and a T-fitting, portions of the channel having been broken away to expose the bracket;

FIG. 2 is a section taken along line 2—2 of FIG. 1;

FIG. 3 is a diagram similar to FIG. 2 and to the same scale showing the manner in which the installation tool is used to spread the divergent sidewalls of the channel apart preparatory to releasing one of its inturned flanges into place behind the wing of the adjacent V-shaped flange on the bracket; and, FIG. 4 is fragmentary horizontal section showing how the cable is hung from the bracket preparatory to attaching the channel thereto.

DESCRIPTION OF THE PREFERRED EMBODIMENTS

Referring next to the drawings for a detailed description of the present invention and, initially, to FIGS. 1 and 2 for this purpose, reference numeral 10 has been chosen to broadly designate the cable sheath assembly which includes the channel member formed from a springable material and the mounting bracket therefor that have been similarly referred to by reference numerals 12 and 14, respectively. Reference numerals 16 and 18, on the other hand, refer in a general way to the T-fitting and the installation tool of FIG. 3, the use of which will be described presently. Channel 12 will be seen to comprise a sheet metal part shaped to form a generally channel shaped cross section defined by a web 20 bordered on both sides by divergent sidewalls 22 that terminate in inturned essentially coplanar flanges 24 which cooperate with one another to define what will be denominated here as an "open base" in the sense that it has a wide slot 26 down the center thereof extending approximately the full width of the web.

Bracket 14 has a centrally-located essentially planar web 28 bordered both top and bottom by integrally-formed generally V-shaped flanges 30. Each such flange, in turn, includes a forwardly-projecting inboard portion 32 joined at its front margin by a rearwardly-extending divergent wing 34 terminating in a free edge 36 spaced in front of the web by a least the thickness of the inturned flange 24 of the channel and, preferably, at least double the latter as seen most clearly in FIG. 2. In FIG. 1, it will be seen that the web 28 of the bracket includes a selection of apertures 38 for fastening it to a suitable supporting surface W by means of a conventional fastener F. Optional integrally-formed stiffening ribs 40 are also revealed in FIG. 1 running perpendicular to the V-shaped flanges 30.

Directing the attention briefly to FIG. 4, it best shows an upset portion 42 of the bracket web that is left fastened at both ends to define a vertically-extending slot through which is threaded a suitable wire hanger H or the like for fastening the cable C thereto. A pair of these same hanger-receiving elements 42 are also shown in FIG. 1, but without the cable obscuring either them or fastener F. Obviously, the hanger H can be lengthened as needed to accommodate more than one cable, wire or other element to be housed within the sheath.

Next, with particular reference to FIG. 3, the manner in which an elongate section of channel 12 is mounted in spanning relation to two or more brackets 14 using installation tool 18 will be described in detail. Preparatory to mounting the channel, of course, the brackets must be carefully aligned, usually horizontally, in a manner well known to those skilled in the art. Next, the inturned flange 24 on either the bottom or the top of the channel is hooked behind the corresponding V-shaped flange 30 of the mounting bracket in the manner shown at the bottom of FIG. 3. Obviously, the upper inturned flange 24 can, if desired, be hooked in first although when working close to the floor it is certainly much handier to work from above with the tool 18. Now, the tool 18 can be seen to include a flat thin blade 44 terminating at its remote or "working end" in a reversely-bent hook 46. The opening or gap 48 between opposed portions of the hook is sized to just receive the inturned flange 24 at the base of the channel in the manner shown. Once the tool is hooked underneath flange 24, it becomes a simple matter to lift the upper divergent sidewall 22 of the channel into a position wherein the free edge of flange 24 rests upon the exposed upturned surface of upwardly and rearwardly-extending bracket wing 36. With the flange 24 resting atop wing 36 as just described, it becomes a simple matter to push the channel toward the supporting surface with the hands, whereupon, the aforementioned flange will ride up on the wing thus spreading and springing the sidewalls 22 farther apart into the phantom-line position shown in FIG. 3. Then, of course, as the free edge of flange 24 passes over the free edge 36 of the bracket wing 34, it will immediately spring into position therebehind as seen in full lines thus completing the attachment of the channel to its mounting brackets. Ample space is left between the wall W or other supporting surface and the free edge 36 of the wing to accoamodate the thickness of flange 24 and, preferably, also that of the blade of the mounting tool 18, again as shown in FIG. 3. In so doing, the wing 34 of the mounting bracket functions as a cam surface operative to spread the divergent sidewalls 22 of the channel 12 apart far enough to permit the flange 24 thereof to be received in behind the free edge of the aforementioned wing, all without marring the adjacent wall surface or damaging either the mounting brackets or the channel while installing the latter. Moreover, once the channel is mounted, the two bracket wings cooperate with one another to define limit stops holding the divergent sidewalls of the bracket, which lie in essentially face-to-face parallel relation thereto, a fixed distance apart.

Note also in connection with both FIGS. 2 and 3 that the free edges 36 of the wings 34 on the bracket flanges are spaced in front of the supporting surface W a distance such that the blade 44 of the installation and removal tool 18 can slip in between the two without marring the latter even in the area of the bracket. It is not necessary, however, to spread apart the divergent sidewalls of the channel only over or under the bracket 14 since installation can be accomplished just as easily by inserting the blade of the tool closely adjacent one end or the other thereof.

FIGS. 2 and 3, and particularly FIG. 3 also make it apparent that removal of the channel 12 from its mounting brackets 14 is a simple matter of reversing the installation procedure. Slipping the blade 44 of the tool 18 in behind the inturned flange 24 of the channel member can be easily accomplished even directly over or under the bracket 18 without marring the wall surface W behind it. Spreading the divergent wall surfaces with the tool 18 in the manner shown in phantom lines in FIG. 3 does no harm to the channel which is the only part of the assembly that is visible. Obviously, bending or otherwise damaging the mounting brackets 14, while remaining hidden, would require replacing same; however, they, too, suffer no damage either during installation or removal of the channel.

Finally, directing the attention once again briefly to FIG. 1, the T-fitting 16 is intended as being merely representative of other such fittings including elbows, intersections, etc., all of which readily integrate with the terminal ends of the channels 12 left projecting beyond the ends of the mounting brackets. Into these ends telescope the ends 50 of reduced cross section provided on the fitting. No claim is made to these and other fittings or their manner of being attached to the basic channel 12 since such elements and their telescopic connections are well known in the art. It will suffice, therefore, to point out that various accessories may be combined with the basic channel and mounting bracket assembly 10 to enhance its versatility. Also, the assemblies on both sides of the fitting 16 will function by means of their attachment thereto to hold the accessory in place without supplementary mounting brackets.

What is claimed is:

1. A cable sheath assembly which comprises: a strip of springable sheet material shaped to produce a channel member having opposed sidewalls terminating at their forwardmost extremities in a pair of opposed parallel and substantially coplanar inturned flanges spaced apart to define a cable-receiving slot therebetween, said sidewalls of said channel member extending forwardly in divergent relation and cooperating with their respective inturned flanges to define an internal included angle of less than 90°, and a pair of generally V-shaped flanges arranged in spaced parallel relation to one another cooperating with a substantially planar web bridging the space separating said flanges to define a bracket for mounting said channel member on a substantially flat supporting surface, said V-shaped flanges each having an inboard portion projecting rearwardly from the plane of the web and a forwardly-extending outboard wing depending from said inboard portion that terminates in a free edge spaced to the rear of said web a distance selected to leave a space between said free edge and any supporting surface at least as thick as the thickness of the inturned flanges of the channel member, said wing portions extending forwardly in divergent relation at substantially the same angle as the sidewalls of the channel member, the spacing between said wings and the internal included angles between the sidewalls of the channel member and their inturned flanges being selected such that the former when seated in the latter define limit stops effective to maintain a fixed spaced relation between the channel member sidewalls, and said sidewalls of said channel member when sprung apart and released in a position to place the inturned flanges thereof in the gap left between the free edges of the wings on the V-shaped flanges of the bracket and the supporting surface in front thereof cooperating with said bracket and supporting surface to define an enclosed raceway.

2. The cable sheath assembly as set forth in claim 1 in which: the free edges of the wings on the V-shaped flanges of the bracket are spaced in behind the planar web thereof a distance selected to leave room for a thin-bladed installation tool to be inserted between the inturned channel member flange and the supporting surface in front thereof when said channel member is fastened in place to said bracket.

3. The cable sheath assembly as set forth in claim 1 in which: the spacing between the wings of the bracket is selected to maintain a fixed spaced relation between the sidewalls of the channel member when the latter are in relaxed condition.

4. The cable sheath assembly as set forth in claim 1 in which: the opposed surfaces of the channel member sidewalls and the wings of the V-shaped flanges of the bracket mate in substantially face-to-face contacting relation.

* * * * *